SOLENOID ERROR CHECKING SYSTEM

Filed March 24, 1969 2 Sheets-Sheet 1

INVENTOR
ASSAD RAEHPOUR
BY Louis A Kline
John J. Callahan
Glenn W. Bowen Jr.
HIS ATTORNEYS INVENTOR
ASSAD RAEHPOUR
BY Louis A Kline
John J. Callahan
Glenn W. Bowen Jr.
HIS ATTORNEYS 3,539,786

SOLENOID ERROR CHECKING SYSTEM

Assad Raehpour, Bellbrook, Ohio, assignor to The National Cash Register Company, Dayton, Ohio, a corporation of Maryland Filed Mar. 24, 1969, Ser. No. 809,755
Int. Cl. G41b *25/24;* G06f *11/00*
U.S. Cl. 235—153 2 Claims

ABSTRACT OF THE DISCLOSURE

A solenoid error checking system for sensing error conditions that are associated with the selective energization of a group of solenoids which are energized one at a time in a manner that is determined by a selection means is disclosed. The error checking system indicates that an error has occurred whenever an energization pulse was transmitted to the group of solenoids but none of these solenoids were energized, or whenever an energization pulse was not transmitted to the group of solenoids and a solenoid was energized, or whenever two or more solenoids of the group of solenoids were simultaneously energized and only one of them should have been energized.

BACKGROUND OF THE INVENTION

The disclosed error checking system has application in high-speed printers and other systems which depend upon the energization of certain elements—for example, solenoids—to achieve a particular result. For example, in one type of high-speed printer, printing occurs when a solenoid-actuated printing hammer strikes a pressure-sensitive paper, thereby driving the paper into a type face carried on the drum. The error checking system of the present invention may be employed to detect whenever a solenoid energization error condition has occurred in such a printing system.

DESCRIPTION OF AN EMBODIMENT

Figure 1:
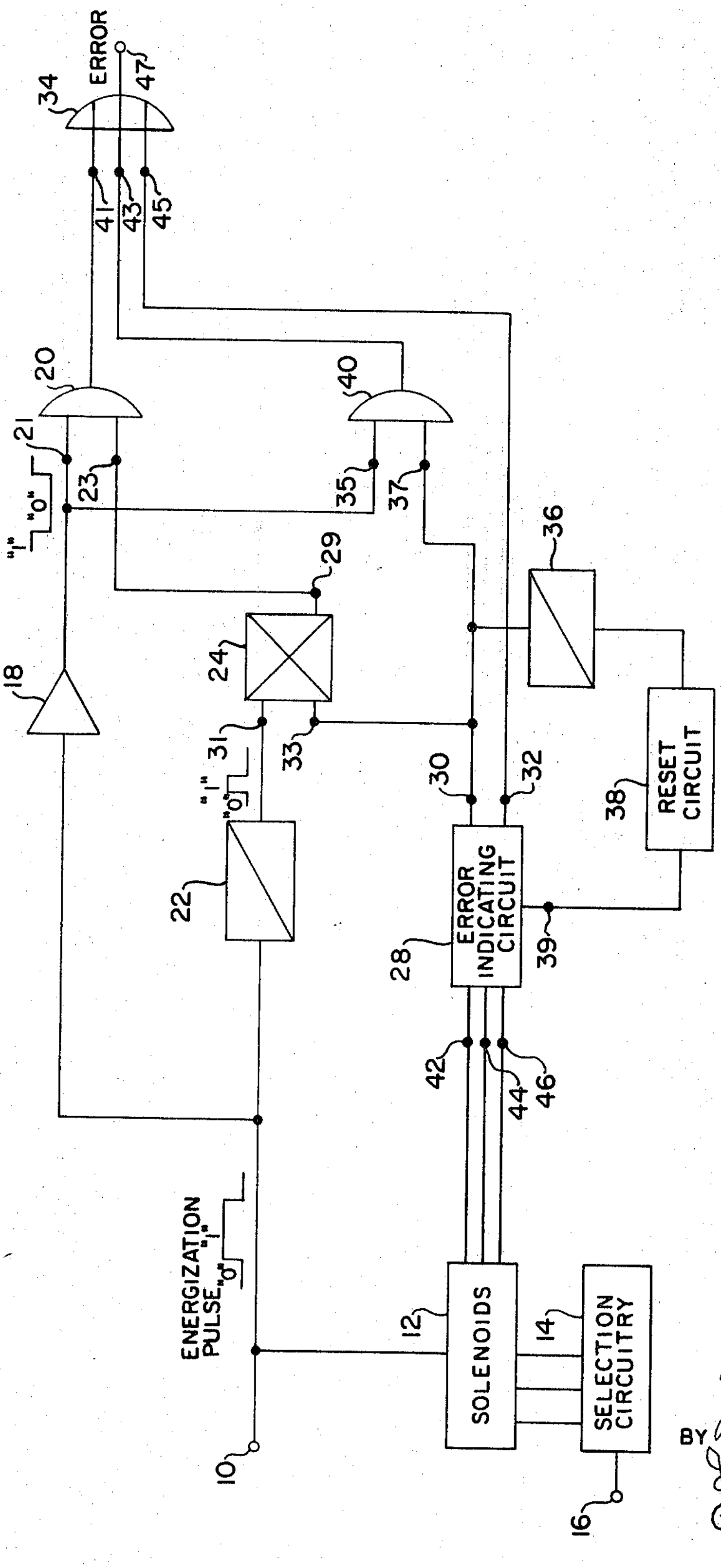
FIG. 1 is a block diagram of the error checking system of the present invention.

In operation, an energization pulse which is produced by a conventional pulse-producing circuit (not shown) is supplied to the input terminal 10 of the error checking system of FIG. 1, and the energization pulse is thereby coupled to the group of solenoids 12, only one solenoid of which is selected for energization at any given time by the conventional selection circuit 14. The selection circuit 14 determines which one of the solenoids of the group of solenoids 12 is to be energized at a given time in accordance with the control signal which is supplied to the input terminal 16 of the selection circuit 14 by a conventional control circuit (not shown). The energization pulse that is applied to the terminal 10 is also thereby supplied to the input of the one-shot multivibrator 22 and to the input of the inverter 18, which has its output coupled to the input terminal 21 of the AND gate 20 and to the input terminal 35 of the AND gate 40.

Figure 2:
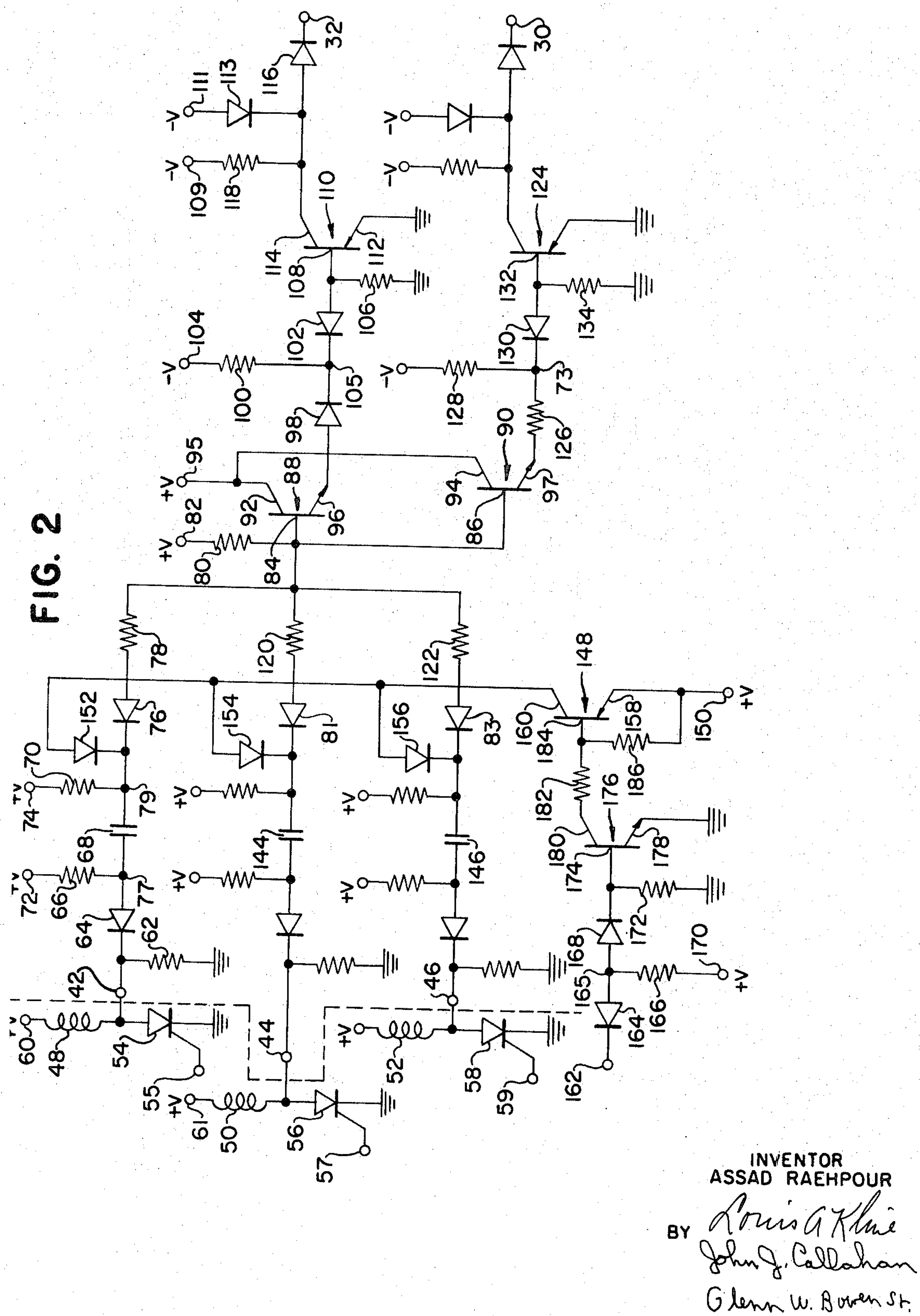
FIG. 2 is a schematic of an error indicating circuit which is employed in the error checking system of FIG. 1.

The error indicating circuit 28, which is shown in the block diagram of FIG. 1 and in the schematic of FIG. 2, has each of its input terminals 42, 44, and 46 coupled to an individual solenoid coil in the group of solenoids 12. The error indicating circuit 28 is shown as having only three input terminals, for illustrative purposes, and, therefore, the group of solenoids 12 in FIG. 1 consists of only three solenoids. It will be appeciated that any number of solenoids may be employed in the group of solenoids 12, however. The error indicating circuit 28 is constructed to produce an output pulse on its output terminal 30 whenever one solenoid in the group of solenoids 12 has been energized and to produce output pulses on its output terminals 30 and 32 whenever two or more solenoids in the group of solenoids 12 have been energized. The output terminal 30 of the error indicating circuit 28 is coupled to the reset input terminal 33 of the flip-flop 24, to the input terminal 37 of the AND gate 40, and to the input of the one-shot multivibrator 36.

The reset output terminal 29 of the flip-flop circuit 24 is coupled to the input terminal 23 of the AND gate 20. The output of the one-shot multivibrator 36 is coupled to the input of the reset circuit 38, the output of which is connected to the reset terminal 39 of the error indicating circuit 28. The reset circuit 38 is necessary in order to establish initial conditions in the error indicating circuit 28 following an energization cycle of the solenoid coils 12, as will be more fully described in connection with FIG. 2. The output of the AND gate 20 is coupled to the input terminal 41 of the OR circuit 34, the output of the AND gate 40 is coupled to the input terminal 43 of the OR gate 34, and the output terminal 32 of the error indicating circuit 28 is coupled to the input terminal 45 of the OR gate 34. A logic level "1" output signal of the OR gate 34, which occurs on the output terminal 47, indicates that an error has occurred in the energization of a solenoid of the group of solenoids 12.

Operation of the error checking system of FIG. 1 under various conditions will now be described.

(a) Energization pulse transmitted—only one solenoid energized—no error

When an energization pulse has been supplied to the terminal 10 of the error checking system of FIG. 1 and only one solenoid of the group of solenoids 12 is energized, the energization pulse that is supplied to the terminal 10 is inverted by the inverter 18 and is supplied to the input terminal 21 of the AND gate 20 as a logic level "0" signal as long as the energization pulse is at a "1" logic level also. The one-shot multivibrator 22 supplies the "1" logic level pulse to the set input terminal 31 of the flip-flop 24 which has a duration that is shorter than the duration of the energization pulse to drive the flip-flop 24 into its set state. Therefore, the reset output terminal 29 of the flip-flop 24, which is coupled to the input terminal 23 of the AND gate 20, will be at a "0" logic level at this time.

The error indicating circuit 28 is constructed to supply a "1" logic level pulse to its output terminal 30 some time after an energization signal has appeared on one of its input terminals 42, 44, or 46; therefore, the flip-flop 24 will be initially driven into its set state by a "1" logic level pulse from the one-shot multivibrator 22, and it will be subsequently reset by a "1" logic level pulse on the output terminal 30 of the error indicating circuit 28 when one of the solenoids in the group of solenoids 12 has been energized. Following resetting of the flip-flop 24, a "0" logic level pulse will again appear on the input terminal 23 of the AND gate 20. When the energization pulse is terminated, the input terminal 10 will be at a "0" logic level, and a "0" logic level will again appear on the output terminal 30 of the error indicating circuit 28. Thus, when an energization pulse has been supplied to the input terminal 10 and only one solenoid of the group of solenoids 10 has been energized, neither of the AND gates 20 or 40 will be satisfied; a "0" logic level signal will appear on the output terminal 32 of the error indicating circuit 28; and, therefore, the OR gate 34 will not indicate an error condition at the output terminal 47.

(b) Energization pulse transmitted—no solenoid energized—error condition

If an energization pulse has been supplied to the terminal 10, the flip-flop 24 will initially be set in the manner previously described. However, if the error indicating circuit 28 does not sense that any of the solenoids in the group of solenoids 12 have been energized, then the output terminals 30 and 32 of the error indicating circuit 28 will both be at the "0" logic level, and the flip-flop 24 will not be reset. Following the termination of the energization pulse, the inverter 18 will revert to a "1" logic level, and, since the reset output terminal 29 of the flip-flop 24 will also be at a "1" logic level at this time, the AND gate 20 will be satisfied. A "1" logic level output, therefore, will be coupled to the input terminal 41 of the OR gate 34, and a "1" logic level signal will therefore appear on the terminal 47, which signifies that an error has occurred. The AND gate 40, however, will not be satisfied following termination of the energization pulse, even though the output of the inverter 18 is at a "1" logic level at this time, since the output terminal 30 of the error indicating circuit 28 will be at a "0" logic level.

(c) Energization pulse not transmitted—solenoid energized—error condition

When an energization pulse has not been supplied to the terminal 10 but energization of a solenoid is sensed by the error indicating circuit 28, the flip-flop 24 will not be driven into its set state by the one-shot multivibrator 22, and, therefore, the input terminal 23 of the AND gate 20 will have a continuous "0" logic level signal applied to it. The AND gate 40 will, however be satisfied, due to "1" logic level inputs on the input terminals 35 and 37, which are coupled from the inverter 18 and the error indicating circuit 28, respectively. A "1" logic level signal will, therefore, be coupled to the input terminal 43 of the OR gate 34, causing a "1" logic level output signal to appear on the terminal 47, indicating that an error has occurred.

(d) Energization pulse transmitted—two solenoids energized—error condition

If an energization pulse has been transmitted and two or more solenoids have been energized, the one-shot multivibrator 22 will set the flip-flop 24, and a "1" logic level signal will be thereby supplied to the input terminal 23 of the AND gate 20. The error indicating circuit 28 will produce a "1" logic level signal, which will reset the flip-flop 24. The AND gate 20 will not produce a "1" logic level output signal, but a "1" logic level output signal will appear on the output terminal 32 of the error indicating circuit 28 because of the manner in which the circuit is constructed, as will be described more fully in connection with FIG. 2, and this "1" logic level output signal will be coupled to the input terminal 45 of the OR gate 34. The resulting "1" logic level output signal which appears on the output terminal 47 indicates that an error has occurred.

FIG. 2 is a schematic of the error indicating circuit 28 which is employed in the error checking system of FIG. 1. Each of the solenoid coils 48, 50, and 52 is coupled to a separate input terminal of the error indicating circuit 28. For example, the solenoid coil 48 is coupled to the input terminal 42, the solenoid coil 50 is coupled to the input terminal 44, and the solenoid coil 52 is coupled to the input terminal 46. Individual silicon controlled rectifiers are also coupled to each of the input terminals. For example, the silicon controlled rectifier 54 is coupled to the input terminal 42, the silicon controlled rectifier 56 is coupled to the input terminal 44, and the silicon controlled rectifier 58 is coupled to the input terminal 46, The solenoid coils 48, 50 and 52 are individualy energized when the appropriate silicon controlled rectifier 54, 56, or 58, respectively, is gated into a conducting state by the selection circuit 14 of FIG. 1, which is coupled to the gates 55, 57, and 59 of the silicon controlled rectifiers 54, 56, and 58, respectively.

Operation of the circuit of FIG. 2 will now be described by assuming that the solenoid coil 48 has been selected by the selection circuit 14 so that energization of the silicon controlled rectifier 54 will result in a current flow from the power supply that is coupled to the terminal 60 through the solenoid coil 48 to ground. The voltage at the terminal 42, which initially was approximately at the potential level of the positive power supply that is coupled to the terminal 60, will then drop to a lower positive potential. The resistor 66 is coupled to the terminal 72, which in turn is coupled to a positive power supply; the resistor 70 is coupled to the terminal 74, which in turn is coupled to a positive power supply; and the capacitor 68 is coupled between the resistors 66 and 70. The diode 64 is connected with its cathode connected to the input terminal 42 and its anode connected to the junction point 77 of the resistor 66 and the capacitor 68, and the resistor 62 is coupled from the cathode of the diode 64 to ground.

The capacitor 68 is initially charged so that a predetermined potential exists at the junction point 79 between the resistor 70 and the capacitor 68. The voltage of the power supply that is coupled to the terminal 72 is so selected that it is at lower positive potential than the voltage of the power supply that is coupled to the terminal 60, but at higher positive potential than the voltage of the power supply that is coupled to the terminal 74. Charging current for the capacitor 68 will then flow from the power supply which is coupled to the terminal 72 through the resistor 66 and the resistor 70 into the power supply which is coupled to the terminal 74.

The diode 76 has its cathode coupled to the junction point 79 of the capacitor 68 and the resistor 70 and its anode connected to the resistor 78. The other terminal of the resistor 78 is connected to the resistor 80. The resistor 80 is coupled to the terminal 82, which in turn is coupled to a positive power supply that is at a potential that is equal to or less positive than the potential of the power supply that is coupled to the terminal 74.

The capacitor 68 supplies a discharge current through the resistor 66, the diode 64, and the resistor 62 following the energization of the silicon controlled rectifier 54. Thus, when the silicon controlled rectifier 54 is energized, a current will also flow from the power supply that is coupled to the terminal 82 through the resistors 80 and 78 and the diode 76 to the junction point 79, since the positive potential that exists at the junction point 79 will be lowered.

The collector 92 of the NPN transistor 88 and the collector 94 of the NPN transistor 90 are both coupled to the terminal 95, which is in turn coupled to a positive voltage supply. The emitter 96 of the transistor 88 is coupled to the anode of the diode 98, and the cathode of the diode 98 is coupled to the resistor 100 and to the cathode of the diode 102. The resistor 100 is coupled to the terminal 104, which in turn is coupled to a negative voltage power supply, and, therefore, the diodes 98 and 102 and the resistor 100 form a current steering network. The resistor 106 is connected from the anode of the diode 102 to ground.

When the transistor 88 is cut-off, a current will flow from ground through the resistor 106, the diode 102, and the resistor 100 to the negative voltage supply which is coupled to the terminal 104, resulting in the application of a negative voltage to the base 108 of the PNP transistor 110, thereby driving the transistor 110 into saturation When the transistor 88 is energized, a current will flow from the positive voltage power supply which is coupled to the terminal 95 through the transistor 88, the diode 98, and the resistor 100 to the negative voltage supply which is coupled to the terminal 104. When this occurs, the junction point 105 between the cathodes of the diodes 98 and 102 will be at a positive potential, and the diode 102 will be reversed biased, and a ground potential will be supplied to the base 108 of the transistor 110, thereby driving the transistor 110 into cut-off.

The emitter 112 of the transistor 110 is coupled to ground, and the collector 114 of the transistor 110 is coupled to the anode of the diode 116 and to the load resistor 118, which is coupled to the terminal 109, which in turn has a negative voltage supply coupled to it. The diode 113 has its anode coupled to the terminal 111, to which a negative voltage supply is coupled. When the transistor 110 is cut-off, the voltage at the anode of the diode 116 will be approximately equal to the voltage of the negative voltage power supply which is coupled to the terminal 111, and the diode 116 will therefore be reversed biased, and the output terminal 32 will appear to be connected to an open circuit. This condition represents that two or mores solenoids have not been energized. When the transistor 110 is saturated, the collector 114 of the transistor 110 will be approximately at a ground potential. Therefore, the output terminal 32 will be approximately at a ground potential, and this condition, representing a "1" logic level signal, indicates that two or more solenoids have been energized.

The circuit values of the circuit of FIG. 2 have been so selected that the base 84 and the base 86 of the transistors 88 and 90 have an applied potential such that, when only one silicon controlled rectifier 54, 56 or 58 has been energized, sufficient current will still be supplied through the collector-emitter path of the transistor 88 so that the diode 102 will remain reversed biased. However, when two or more of the rectifiers 54, 56, or 58 have been energized, the voltage at the base 84 of the transistor 88 drops to a lower positive potential due to discharge of the capacitor 68 and the associated increased current flow through the resistors 78, 120, and 122, as the transistor 88 is now able to supply sufficient current through the diode 98 to reverse-bias the diode 102.

The operation of the portion of the circuitry shown in FIG. 2 comprising the transistors 90 and 124 is similar to the operation of the described portion of the circuitry involving the transistors 88 and 110, the differences being that the resistor 126 is substituted for the diode 98, and that the transistor 90 is biased so that the energization of any one of the solenoids 54, 56, or 58 causes the transistor 90 to reduce the amount of current that it supplies through the resistors 126 and 128, so that the diode 130 is not reversed biased when only one of the solenoids 54, 56, or 58 has been energized. Therefore, the output terminal 30 will be at a ground potential if one or more solenoids have been energized, and it will appear to be connected to an open circuit when one or more solenoids have not been energized due to the ground potential which is applied to the base 132 of the transistor 124 through the resistor 134, when the diode 130 is reversed biased.

After the desired solenoid coils have been energized and the energization cycle is completed, it is necessary to discharge the capacitors 68, 144, and 146, in order that the error indicating circuit 28 may be returned to its initial condition. The transistor 148 has its emitter 158 coupled to the terminal 150, which is in turn coupled to a positive power supply. The transistor 148 supplies sufficient current to the diodes 152, 154, and 156 to discharge the capacitors 68, 144, and 146, respectively. The cathodes of the diodes 76, 81, and 83 are coupled to the anodes of the diodes 152, 154, and 156, respectively, to prevent positive voltage pulses from being coupled to the collector 160 of the transistor 148.

The reset signal is an externally controlled signal which is supplied by a control circuit (not shown) to the input terminal 162. The diode 164 has its cathode connected to the input tedminal 162 and its anode connected to the resistor 166 and to the anode of the diode 168. The anodes of the diodes 164 and 168 also are connected to the resistor 166, which is coupled to the terminal 170, which is in turn coupled to a positive power supply. The resistor 172 is connected between the base 174 of the transistor 176 and ground. The emitter 178 of the transistor 176 is connected to ground, while the collector 180 of the transistor 176 is connected to a resistor 182. The resistor 182 is coupled to the base 184 of the transistor 148 and to a resistor 186, which is coupled to the terminal 150. The resistors 182 and 186 constitute a load resistance for the transistor 176 and a biasing network for the transistor 148. If the reset terminal 162 is at a negative potential level, the junction point 165 will be at a negative potiential, and the diode 168 will be reversed biased, and therefore a ground potential will appear on the base 174 of the transistor 176, since the resistor 172 is connected to ground.

When the voltage on the terminal 162 is at a negative level such that the diode 164 is forward biased and the diode 168 is reversed biased, the voltage on the base 174 of the transistor 176 is at a ground level, and the transistor 176 is cut-off. A reset signal supplied to the reset terminal 162 will reverse bias the diode 164 and the junction point 165 of the anodes of the diodes 164 and 168, and the resistor 166 will be at a positive potential level due to the current that flows to ground through the resistor 172 from the power supply which is coupled to the terminal 170.

When a positive potential level is present on the terminal 162, which reverse biases the diode 164, the resulting positive potential on the base 174 of the transistor 176 will drive the transistor 176 into saturation. When the transistor 176 is in a saturated state, a relatively low positive potential is present on the base 184 of the transistor 148, and the transistor 148 will, therefore, conduct substantially, and current will be supplied through the diodes 152, 154, and 156 to reset the capacitors 68, 144, and 146, respectively.

What is claimed is:

1. An error checking system for sensing error conditions associated with the selective energization of a group of energizable elements, only one of which elements is to be energized at any given time by an energization signal, comprising:

an error indicating means having a first and second output terminal and a plurality of input terminals, each terminal of the plurality of the input terminals being coupled to a separate one of the energizable elements, the error indicating means being constructed to produce at its first output terminal a first signal, the initiation of which is delayed in time with respect to the initiation of the energization signal, which indicates that one energizable element has been energized, if such is the case, and to produce at its second output terminal a second signal, which indicates that two or more energizable elements have been energized, if such is the case, and means coupled to receive the energization signal and to produce a triggering signal which is initiated by the energization signal and which is of a shorter duration than the energization signal, and a bistable means having a first and a second input terminal and at least one output terminal, the first input terminal of the bistable means being coupled to the means to produce the triggering signal to receive the triggering signal, the second input terminal of the bistable means being coupled to the first output terminal of the error indicating means to receive the first signal, the bistable means being constructed to be set into its first state when a signal is received at its first input terminal and to be triggerable to a second state when the second signal is received at its second input terminal, the state of the bistable means being represented by an output signal at a first output terminal of the bistable means, and means to provide a signal representing the logical inverse of the eneirgzation signal, and means to perform a first logical "AND" function having a first and a second input terminal and output terminal, the first terminal of the first "AND" means being coupled to the means to produce the logical inverse signal of the energization signal to receive the logical inverse signal, and the second terminal of the first "AND" means being coupled to the first output terminal of the bistable means, and means to produce a second logical "AND" function having a first and a second input terminal and an output terminal, the first terminal of the second "AND" means being coupled to the means to provide the logical inverse signal of the energization signal to receive the logical inverse signal, and the second terminal of the second "AND" means being coupled to the first terminal of the error indicating means to receive the first signal, and means to provide a logical "OR" function having first, second, and third input terminals and an output terminal, the first input terminal of the "OR" means being coupled to the output terminal of the first "AND" means, the second input terminal of the "OR" means being coupled to the output terminal of the second "AND" means, and the third input terminal of the "OR" means being coupled to the second output terminal of the indicating means to receive the second signal, the signal at the output terminal of the "OR" means being indicative of whether or not an energization error condition has occurred.

2. An error checking system as in claim 1 wherein the selectively energizable elements are solenoids which each have a solenoid coil, and each input terminal of the error indicating means is coupled to an individual one of these solenoid coils.

References Cited

Barcomb and Martin, Hammer Check Circuit, IBM Technical Disclosure Bulletin, vol. 8, No. 9, February 1966. Copy in 230.

MALCOLM A. MORRISON, Primary Examiner

C. E. ATKINSON, Assistant Examiner

U.S. Cl. X.R.

101—93; 178—23